United States Patent
Norden et al.

(10) Patent No.: US 6,859,873 B2
(45) Date of Patent: Feb. 22, 2005

(54) VARIABLE LENGTH INSTRUCTION PIPELINE

(75) Inventors: Erik K. Norden, Santa Clara, CA (US); Roger D. Arnold, Sunnyvale, CA (US); Robert E. Ober, San Jose, CA (US); Neil S. Hastie, Gloucestershire (GB)

(73) Assignee: Infineon Technologies AG, Munich (DE)

( * ) Notice: Subject to any disclaimer, the term of this patent is extended or adjusted under 35 U.S.C. 154(b) by 643 days.

(21) Appl. No.: 09/878,145

(22) Filed: Jun. 8, 2001

(65) Prior Publication Data

US 2002/0199085 A1 Dec. 26, 2002

(51) Int. Cl.[7] .............................. G06F 9/30
(52) U.S. Cl. .................. 712/220; 712/210; 712/216
(58) Field of Search ............... 712/210, 216, 712/220, 219

(56) References Cited

U.S. PATENT DOCUMENTS

| | | | |
|---|---|---|---|
| 5,796,972 A | * 8/1998 | Johnson et al. | 712/208 |
| 5,878,242 A | * 3/1999 | Olson et al. | 712/216 |
| 5,937,177 A | * 8/1999 | Molnar et al. | 712/200 |
| 6,157,988 A | * 12/2000 | Dowling | 711/140 |
| 6,272,616 B1 | * 8/2001 | Fernando et al. | 712/20 |

* cited by examiner

Primary Examiner—Eric Coleman
(74) Attorney, Agent, or Firm—Bever, Hoffman & Harms, LLP; Edward S. Mao

(57) ABSTRACT

A variable length instruction pipeline includes optional expansion stages that can be included in the variable length instruction pipeline to avoid pipeline stalls. The expansion stages are removed from the variable length instruction pipeline when not needed to reduce the length of the pipeline, which reduces latency and other problems associated with long pipelines. For example, in one embodiment of the present invention, a variable length instruction pipeline includes a first pipeline stage, a first expansion stage, and a second pipeline stage. The second pipeline stage is configured to selectively receive instructions from the first pipeline stage or the first expansion stage if the first expansion stage holds an instruction.

8 Claims, 15 Drawing Sheets

| B1 STAGE 425 | B2 STAGE 427 | D STAGE 130 | E1 STAGE 140 | E2 STAGE 150 | W STAGE 160 |
|---|---|---|---|---|---|
| ADD D1, D0, #1 | | | | | |

| D STAGE 230 | E1 STAGE 240 | E2 STAGE 250 | W STAGE 260 |
|---|---|---|---|
| LD D0, [A0] | | | |

Figure 5(a)

| B1 STAGE 425 | B2 STAGE 427 | D STAGE 130 | E1 STAGE 140 | E2 STAGE 150 | W STAGE 160 |
|---|---|---|---|---|---|
| | ADD D1, D0, #1 | | | | |

| D STAGE 230 | E1 STAGE 240 | E2 STAGE 250 | W STAGE 260 |
|---|---|---|---|
| LD D0, [A0] | | | |

Figure 5(b)

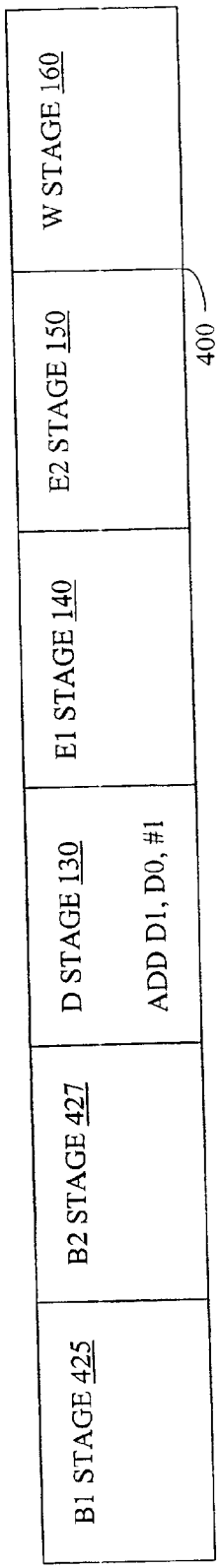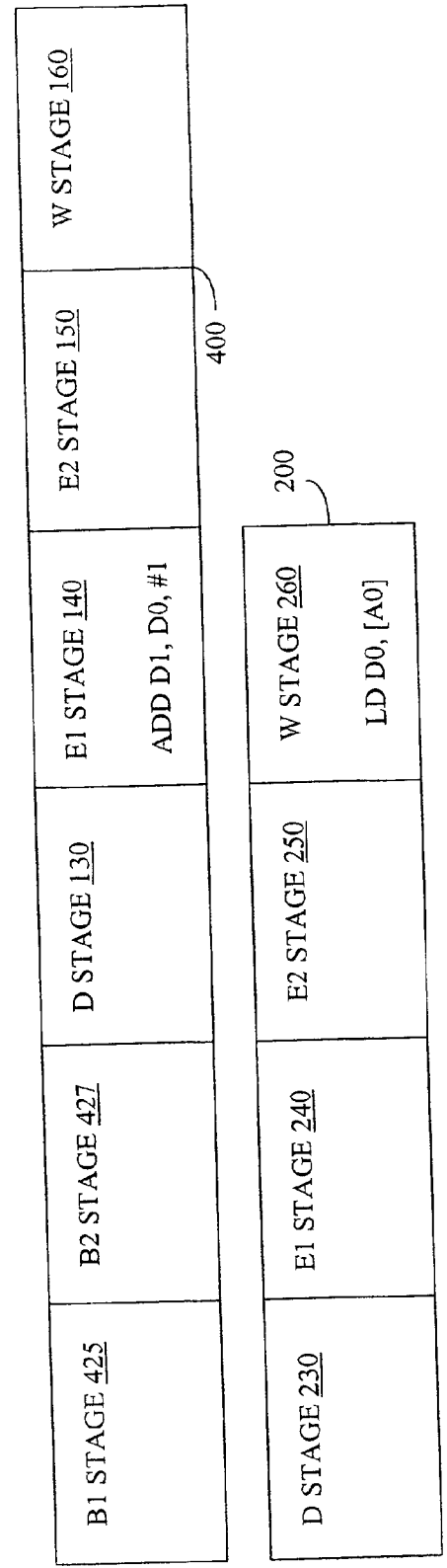
Figure 5(c)
Figure 5(d)

| B1 STAGE 425 | B2 STAGE 427 | D STAGE 130 | E1 STAGE 140 | E2 STAGE 150 | W STAGE 160 |
|---|---|---|---|---|---|
| | | | | ADD D1, D0, #1 | |

400

| D STAGE 230 | E1 STAGE 240 | E2 STAGE 250 | W STAGE 260 |
|---|---|---|---|

| B1 STAGE 425 | B2 STAGE 427 | D STAGE 130 | E1 STAGE 140 | E2 STAGE 150 | W STAGE 160 |
|---|---|---|---|---|---|
| | | | | | ADD D1, D0, #1 |

400

| D STAGE 230 | E1 STAGE 240 | E2 STAGE 250 | W STAGE 260 |
|---|---|---|---|

| EX1 STAGE 630 | D STAGE 130 | E1 STAGE 140 | E2 STAGE 150 | W STAGE 160 |
|---|---|---|---|---|
| ADD D3, D0, #2 | ADD D3, D0, #1 | | SUB D3, D1, #1 | |

| D STAGE 230 | E1 STAGE 240 | E2 STAGE 250 | W STAGE 260 |
|---|---|---|---|
| LD D0, [A3] | LD D0, [A2] | LD D0, [A1] | |

| EX2 STAGE 610 | EX1 STAGE 630 | D STAGE 130 | E1 STAGE 140 | E2 STAGE 150 | W STAGE 160 |
|---|---|---|---|---|---|
| ADD D3, D0, #3 | ADD D3, D0, #2 | ADD D3, D0, #1 | | | SUB D3, D1, #1 |

| D STAGE 230 | E1 STAGE 240 | E2 STAGE 250 | W STAGE 260 |
|---|---|---|---|
| LD D0, [A4] | LD D0, [A3] | LD D0, [A2] | LD D0, [A1] |

| EX2 STAGE 610 | EX1 STAGE 630 | D STAGE 130 | E1 STAGE 140 | E2 STAGE 150 | W STAGE 160 |
|---|---|---|---|---|---|
| ADD D3, D0, #4 | ADD D3, D0, #3 | ADD D3, D0, #2 | ADD D3, D0, #1 | | |

| D STAGE 230 | E1 STAGE 240 | E2 STAGE 250 | W STAGE 260 |
|---|---|---|---|
| | LD D0, [A4] | LD D0, [A3] | LD D0, [A2] |

| EX1 STAGE 630 | D STAGE 130 | E1 STAGE 140 | E2 STAGE 150 | W STAGE 160 |
|---|---|---|---|---|
| ADD D3, D0, #4 | ADD D3, D0, #3 | ADD D3, D0, #2 | ADD D3, D0, #1 | |

| D STAGE 230 | E1 STAGE 240 | E2 STAGE 250 | W STAGE 260 |
|---|---|---|---|
| | LD D0, [A4] | LD D0, [A3] |

VARIABLE LENGTH INSTRUCTION PIPELINE

FIELD OF THE INVENTION

The present invention relates to pipelined processing systems, and more particularly to a method and apparatus for avoiding pipeline stalls.

BACKGROUND OF THE INVENTION

Modern computer systems utilize a variety of different microprocessor architectures to perform program execution. Each microprocessor architecture is configured to execute programs made up of a number of macro instructions and micro instructions. Many macro instructions are translated or decoded into a sequence of micro instructions before processing. Micro instructions are simple machine instructions that can be executed directly by a microprocessor.

To increase processing power, most microprocessors use multiple pipelines, such as an integer pipeline and a load/store pipeline to process the macro and micro instructions. Typically, an integer pipeline consists of multiple stages. Each stage in an integer pipeline operates in parallel with the other stages. However, each stage operates on a different macro or micro instruction.

FIG. 1 shows an instruction fetch and issue unit, having an instruction fetch stage (I stage) 105 and a pre-decode stage (PD stage) 110, coupled to atypical four stage integer pipeline 120 for a microprocessor. Integer pipeline 120 comprises a decode stage (D stage) 130, an execute one stage (E1 stage) 140, an execute two stage (E2 stage) 150, and a write back stage (W stage) 160. Instruction fetch stage 105 fetches instructions to be processed. Pre-decode stage 110 groups and issues instructions to one or more pipelines. Ideally, instructions are issued into integer pipeline 120 every clock cycle. Each instruction passes through the pipeline and is processed by each stage as necessary. Thus, during ideal operating conditions integer pipeline 120 is simultaneously processing 4 instructions. However, many conditions as explained below may prevent the ideal operation of integer pipeline 120.

Decode stage 130 decodes the instruction and gathers the source operands needed by the instruction being processed in decode stage 130. Execute one stage 140 and execute two stage 150 performs the function of the instructions. Write back stage 160 writes the appropriate result value into the register file. Pipeline 120 can be enhanced by including forwarding paths between the various stages of integer pipeline 120 as well as forwarding paths between stages of other pipelines. For brevity and clarity, forwarding paths, which are well known in the art, are not described in detail herein.

FIG. 2 shows a typical four stage load/store pipeline 200 for a microprocessor coupled to instruction fetch stage 105 and pre-decode stage 110. Load/store pipeline 200 includes a decode stage (D stage) 230, an execute one stage (E1 stage) 240, an execute two stage (E2 stage) 250, and a write back stage (W stage) 260. Load/store pipeline 200 is specifically tailored to perform load and store instructions. By including both a load/store pipeline and an integer pipeline, overall performance of a microprocessor is enhanced because the load/store pipeline and integer pipelines can perform in parallel. Decode stage 230 decodes the instruction and reads the register file for the needed information regarding the instruction. Execute one stage 240 calculates memory addresses for the load or store instructions. For

2 store instructions, execute two stage 250 stores the appropriate value into memory. For load instructions, execute two stage 250 retrieves information from the appropriate location. For register load operations, write back stage 260 writes the appropriate value into a register file.

Ideally, integer pipeline 120 and load/store pipeline 200 can execute instructions every clock cycle. However, many situations may occur that cause parts of integer pipeline 120 or load/store pipeline 200 to stall, thereby degrading the performance of the microprocessor. FIGS. 3(a)–3(f) illustrate a load-use data dependency problem which causes parts of integer pipeline 120 to stall. Load-use data dependency problems are caused by the issuance of a load instruction followed by an instruction that requires that data being loaded by the load instruction. Specifically, FIGS. 3(a)–3(f) illustrate an instruction "LD D0, [A0]" followed by an instruction "ADD D1, D0, #1". "LD D0, [A0]" causes the value at address A0 to be loaded into data register D0. "ADD D1, D0, #1" adds one to the value in data register D0 and stores the result in data register D1. Thus, the add instruction requires the data (the new value of data register D0) from the load instruction to properly calculate the new value for data register D1. For clarity, FIGS. 3(a)–3(f) omit instruction fetch stage 105 and pre-decode stage 110. To avoid confusion, only two instructions are shown in FIGS. 3(a) –3(f). In actual use other instructions would usually be processed simultaneously in other stages of the pipelines. As shown in FIG. 3(a), instruction "LD D0, [A0]" is first processed in decode stage 230 of integer pipeline 200 and instruction "ADD D1, D0, #1" is processed in decode stage 130 of integer pipeline 120 . Then, as shown in FIG. 3(b), instruction "LD D0, [A0]" is processed in execute one stage 240 of load/store pipeline 200. If instruction "ADD D1, D0, #1" were allowed to propagate through integer pipeline 120, the current value in data register D0 would be used in the add instruction rather than the new value to be loaded from address A0. Thus, decode stage 130, which is configured to detect load-use data dependency problems, holds instruction "ADD D1, D0, #1" in decode stage 130. Because decode stage 130 is full, a pipeline stall at decode stage 130 of integer pipeline 120 occurs. Thus, pre-decode stage 110 could not issue additional instructions into integer pipeline 120.

Then, as shown in FIG. 3(c), instruction "LD D0, [A0]" is processed in execute two stage 250 of load/store pipeline 200. Because the new value of data register D0 is still not available, instruction "ADD D1, D0, #1" remains in decode stage 130. As shown in FIG. 3(d), instruction "ADD D1, D0, #1" proceeds to execute stage 140 when instruction "LD D0, [A0]" proceeds to write back stage 260, because load/store pipeline 200 can forward the new value for data register D0 from execute two stage 250 to decode stage 130. In some microprocessors, timing constraints prohibit forwarding from execute two stage 250. For these microprocessors, instruction "ADD D1, D0, #1" would remain in decode stage 130 until instruction "LD D0, [A0]" is processed by write back stage 260, As shown in FIGS. 3(e) and 3(f), after the new data value for data register D0 is available, instruction "LD D0, [A0]" is processed through execute two stage 150 and write back stage 160.

As explained above, stalling a pipeline or parts of a pipeline degrades the overall processing power of a microprocessor. Because load-use data dependency problems are quite common, integer pipelines have been modified to process load-use instructions without stalling. FIG. 4 illustrates an integer pipeline 400 coupled to instruction fetch stage 105 and pre-decode stage 110. Integer pipeline 400 can be used with load/store pipeline 200 to avoid stalling on load-use instructions. Integer pipeline 400, which is similar to integer pipeline 120, includes all the stages of integer pipeline 120 and adds two buffer stages. Specifically, integer pipeline includes a buffer one stage (B1 stage) 425 and a buffer two stage (B2 stage) 427 preceding decode stage 130. Generally, no processing is performed in buffer one stage 425 and buffer two stage 427. However, in some microprocessors, some pre-decoding is performed in buffer one stage 425 and buffer two stage 427. For consistency similar parts performing similar functions in different figures are given the same reference numerals. Thus, decode stage 130 is used in both integer pipeline 120 of FIG. 1 and integer pipeline 400 of FIG. 4.

FIGS. 5(a)–(f) illustrate the processing of instruction "LD D0, [A0]" followed by the instruction "ADD D1, D0, #1" using integer pipeline 400 and load/store pipeline 200. As shown in FIG. 5(a), instruction "LD D0, [A0]" is first processed in decode stage 230 of load/store pipeline 200 and instruction "ADD D1, D0, #1" is stored in buffer one stage 425 of integer pipeline 400. Then, as shown in FIG. 5(b), instruction "LD D0, [A0]" is processed in execute one stage 240 of load/store pipeline 200 and instruction "ADD D1, D0, #1" is stored in buffer two stage 427 of integer pipeline 400. Then, as shown in FIG. 5(c), instruction "LD D0, [A0]" is processed in execute two stage 250 of load/store pipeline 200 and instruction "ADD D1, D0, #1" is processed in decode stage 130 of integer pipeline 400. As shown in FIG. 5(d), instruction "LD D0, [A0]" is next processed in write back stage 260, As explained above, load/store pipeline 200 can forward the new value for data register D0 from execute two stage 250 using a forwarding path (not shown). Thus, instruction "ADD D1, D0, #1" can proceed to execute one stage 140 without stalling integer pipeline 400. As shown in FIGS. 5(e) and 5(f), after the new data value for data register D0 is available, instruction "ADD D1, D0, #1" is processed through execute two stage 150 and write back stage 160 of integer pipeline 400.

Thus, including buffer one stage 425 and buffer two stage 427 allows integer pipeline 400 to avoid stalling on load-use data dependency problems. However, using buffer one stage 425 and buffer two stage 427 increases the latency of integer pipeline 400 because an instruction must pass through six stages of integer pipeline 400 rather than the four stages of integer pipeline 120. Furthermore, longer integer pipelines suffer delays on several other types of pipeline stalls. For example, conditional branching instruction may cause processing of instructions that should not be processed. A typical conditional branch instructions has the form: If {branch condition is satisfied} then jump to the instruction at the {branch address}. For example the macro instruction "JZ 100" can be interpreted as: if {the operand of the preceding instruction was zero} then jump to the instruction at {address 100}. To avoid pipeline stalls, most processors select an outcome for the conditional branch instruction and process instructions as if the selected outcome is correct. Actual determination of the conditional branch condition does not occur until execute one stage 140 or execute two stage 150. Thus, in longer pipelines, determination of the result of the conditional branch instruction is delayed as compared to shorter pipelines. Specifically, each buffer stage delays determination of the conditional branch instruction by one clock cycle. Thus, the performance of integer pipeline 400 on conditional branch instruction is worse than the performance of integer pipeline 120. In addition, a mixed register instruction, which uses the data register file of the integer pipeline and the execution stages of the load/store pipeline, would cause stalls in parts of the load/store pipeline due to the delays caused by the buffer one stage and the buffer two stage. Thus, the conventional solution to avoid load-use data dependency problems degrades performance for other instruction types and may reduce the overall processing speed of the microprocessor. Hence there is a need for an integer pipeline that can avoid load-use data dependency problems while minimizing problems associated with long integer pipelines.

SUMMARY

Accordingly, a variable length instruction pipeline in accordance with one embodiment of the present invention includes expansion stages which can be inserted into an instruction pipeline to avoid load-use data dependency problems and removed from the instruction pipeline when not needed, thereby minimizing problems associated with long instruction pipelines. For example, in one embodiment of the present invention, a variable length instruction pipeline includes a first pipeline stage, a first expansion stage, and a second pipeline stage. The first expansion stage is coupled to the first pipeline stage and the second pipeline stage. The second pipeline stage, which is also coupled to the first pipeline stage, is configured to selectively receive instructions from the first pipeline stage or the first expansion stage. Specifically, an instruction is issued from the first pipeline stage to the second pipeline stage when the second pipeline stage can accept the instruction. However, the instruction is issued to the first expansion stage if the second pipeline stage can not accept the instruction.

In another embodiment of the present invention, a second expansion stage is coupled to the first pipeline stage and the first expansion stage. Multiplexers are included to route the instructions from the first pipeline stage to the second expansion stage, the first expansion stage, or the second pipeline stage. For example, if the first expansion stage and the second pipeline stage cannot accept instructions an instruction would be issued into the second expansion stage. In general, an instruction in the second expansion stage would be issued or passed into the first expansion stage when the first expansion stage can accept instructions. Similarly, an instruction in the first expansion stage would be issued or passed into the second pipeline stage, when the second pipeline stage can accept instructions.

The present invention will be more fully understood in view of the following description and drawings.

BRIEF DESCRIPTION OF THE DRAWINGS

FIGS. 5(a)–5(f) illustrate the performance of an integer pipeline and a load/store pipeline.

FIGS. 7(a)–7(j) illustrate the performance of an integer pipeline and a load/store pipeline in accordance with one embodiment of the present invention.

DETAILED DESCRIPTION

Figure 1:
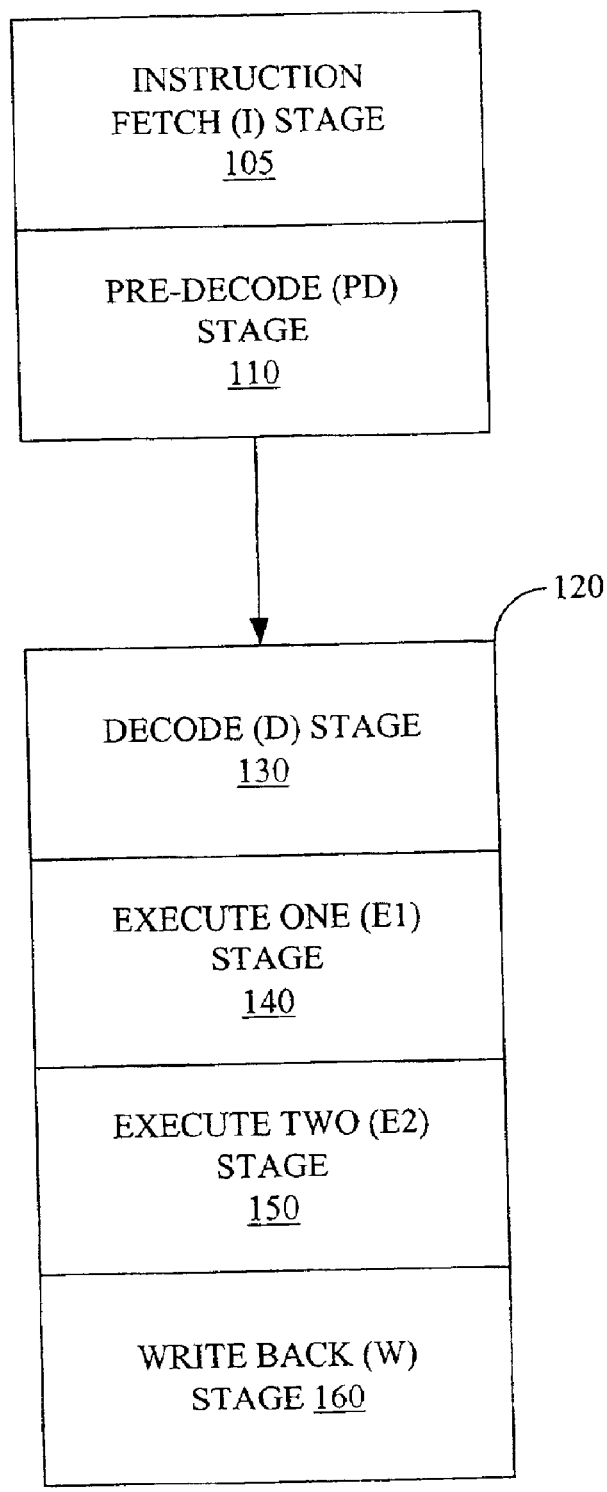
FIG. 1 is a simplified diagram of a conventional integer pipeline.
Figure 2:
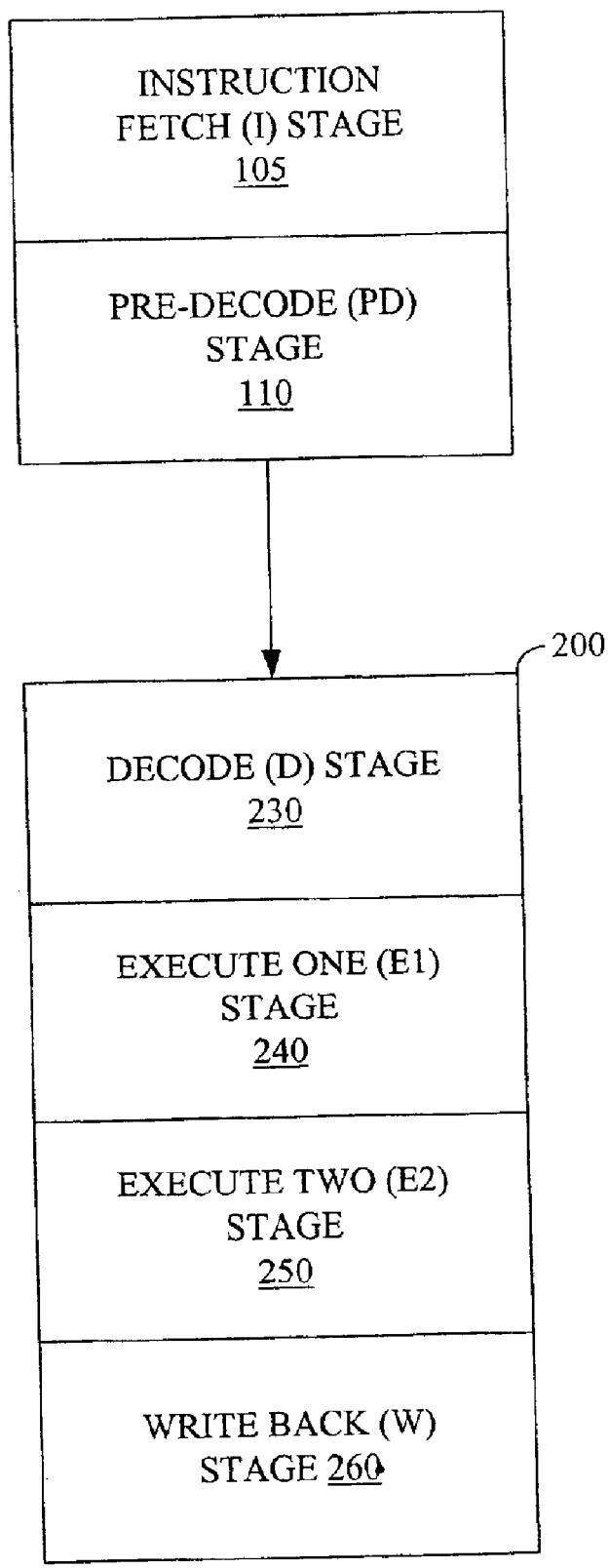
FIG. 2 is a simplified diagram of a conventional load/store pipeline.
Figure 3A:
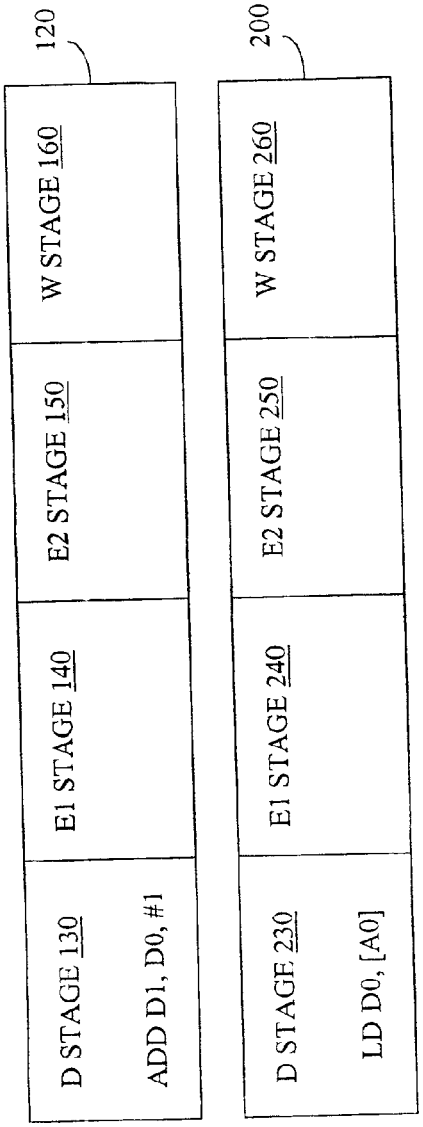
FIGS. 3(a)–3(f) illustrate the performance of an integer pipeline and a load/store pipeline.
Figure 3B:
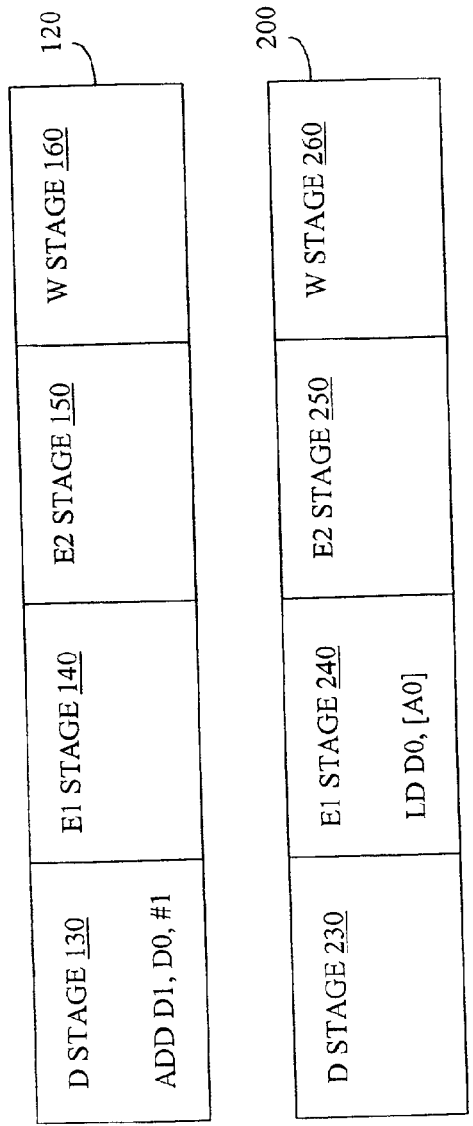
Figure 3C:
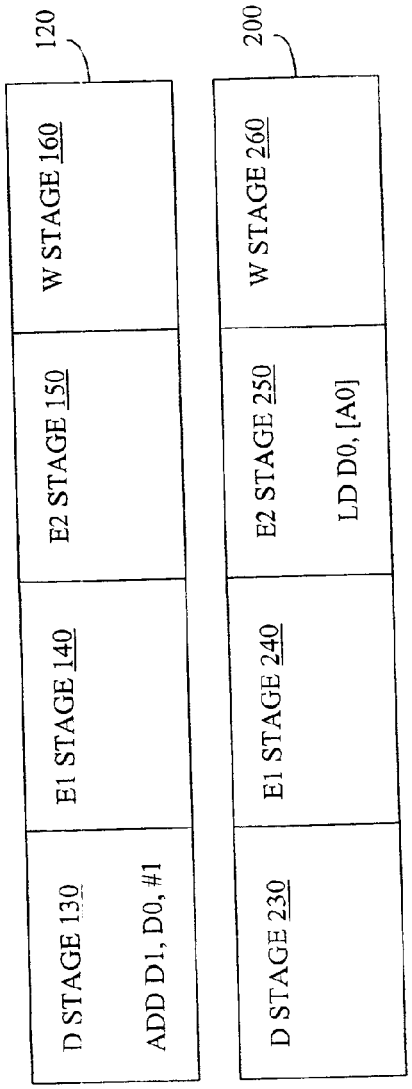
Figure 3D:
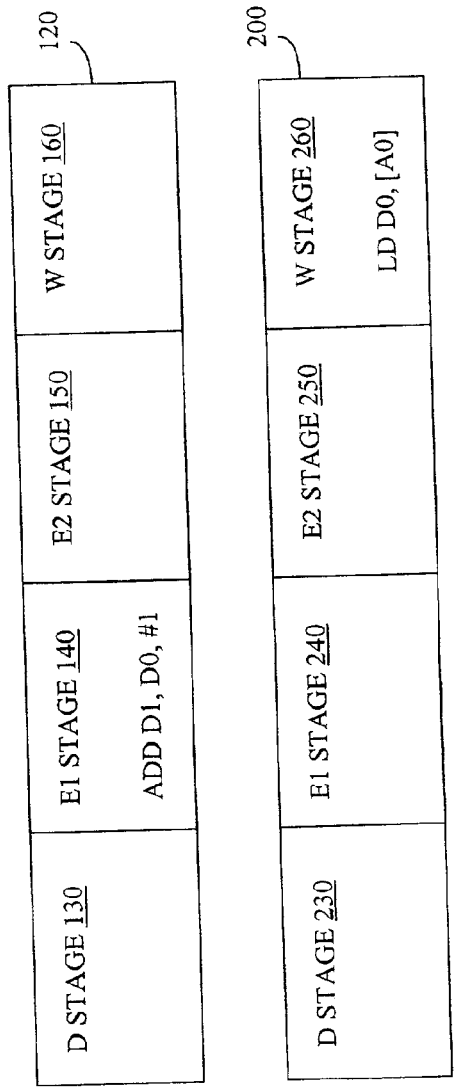
Figure 3E:
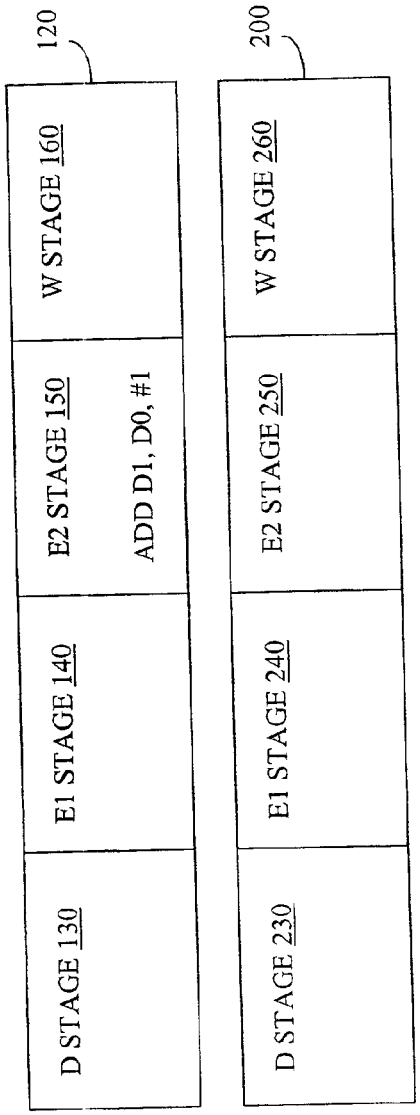
Figure 3F:
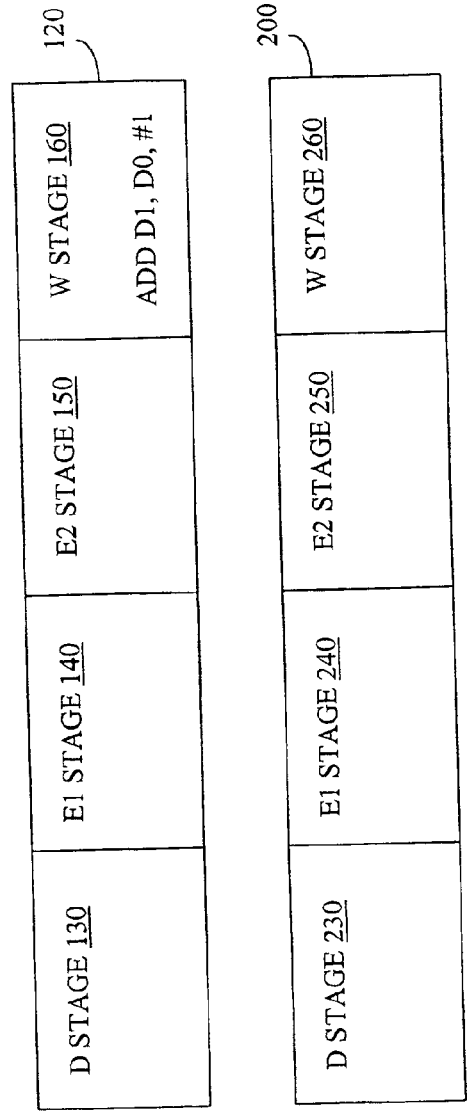
Figure 4:
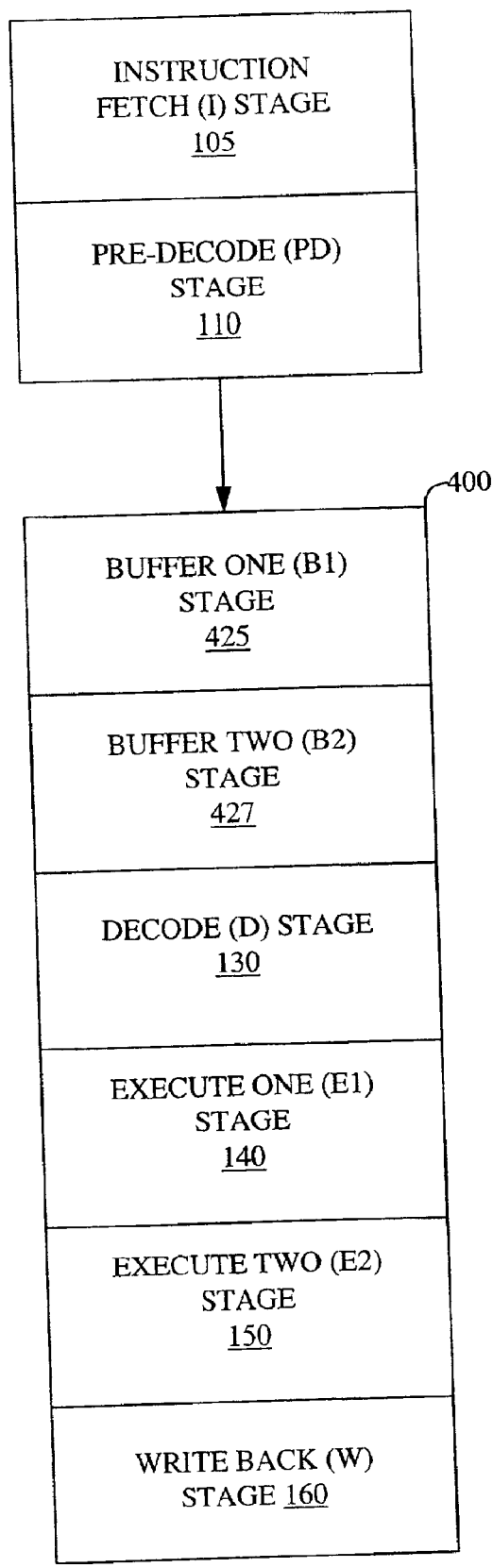
FIG. 4 is a simplified diagram of a conventional integer pipeline.
Figure 6:
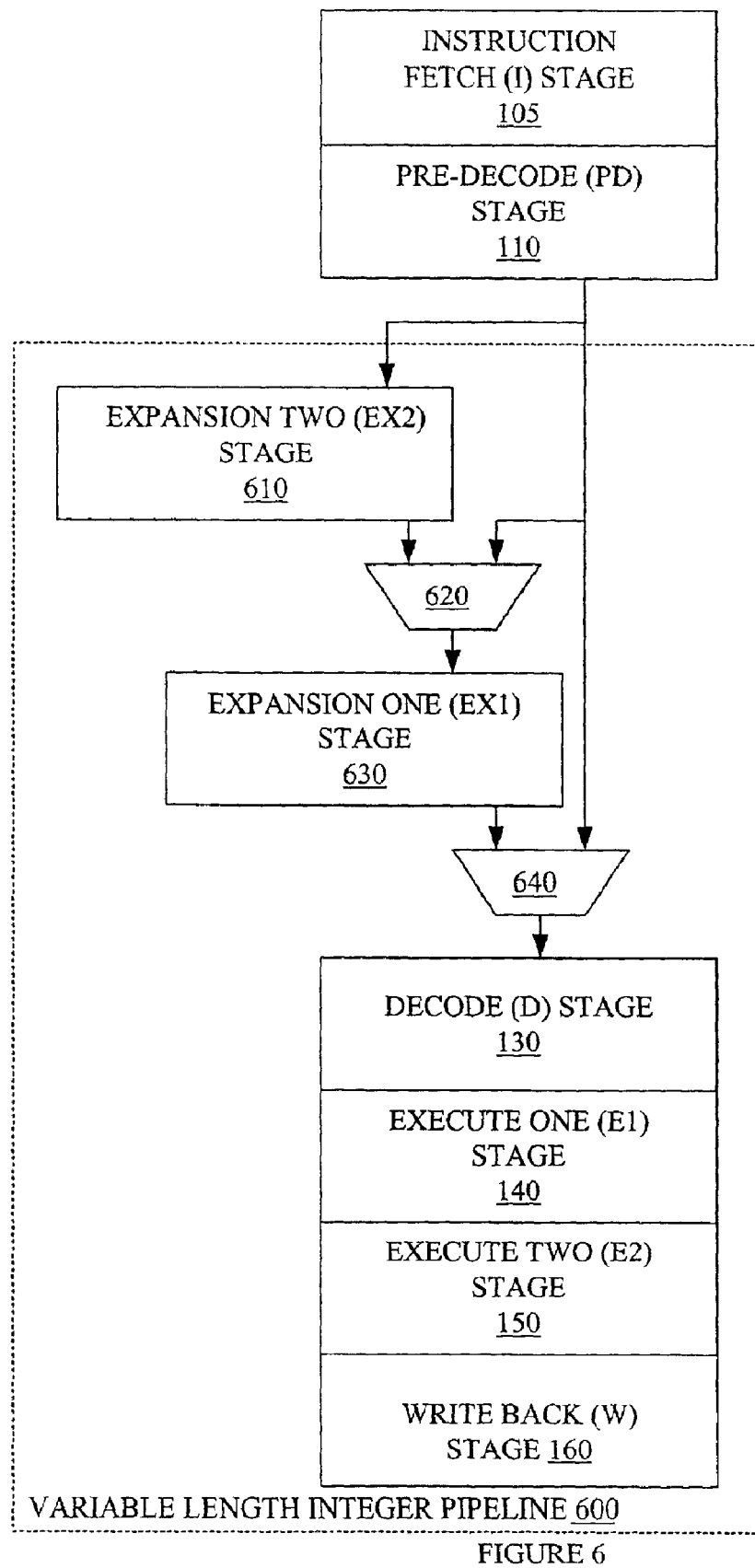
FIG. 6 is a block diagram of a variable length integer pipeline in accordance with one embodiment of the present invention.

FIG. 6 is a block diagram of a variable length integer pipeline 600 in accordance with one embodiment of the present invention. Variable length integer pipeline 600 is coupled to instruction fetch stage 105, pre-decode stage 110 and includes decode stage 130, execute one stage 140, execute two stage 150, write back stage 160, an expansion one stage (EX1 stage) 630, an expansion two stage (EX2 stage) 610, a multiplexer 620, and an multiplexer 640. Variable length integer pipeline can function as a four stage pipeline, a five stage pipeline or a six stage pipeline. Other embodiments of the present invention may include more expansion stages to allow even greater flexibility. Furthermore, some embodiments of the present invention may use only a single expansion stage. For clarity, the examples described herein use a variable length integer pipeline, however the principles of the present invention can be adapted for use with any type of instruction pipelines.

In the four stage configuration, instructions from pre-decode stage 110 pass through decode stage 130, execute one stage 140, execute two stage 150, and write back stage 160. Instructions are passed from pre-decode stage 110 to decode stage 130 through multiplexer 640. In the five stage configuration, expansion one stage 630 is inserted in between pre-decode stage 110 and decode stage 130. Specifically, multiplexer 620 is configured to pass instructions from pre-decode stage 110 to expansion one stage 630, while multiplexer 640 is configured to pass instructions from expansion one stage 630 to decode stage 130. In the six stage configuration, expansion two stage 610 is inserted in between pre-decode stage 110 and expansion one stage 630. Specifically, expansion two stage 610 receives instructions from pre-decode stage 110. Multiplexer 620 is configured to pass instructions from expansion two stage 610 to expansion one stage 630, and multiplexer 640 is configured to pass instructions from expansion one stage 630 to decode stage 130.

To reduce latency and to avoid problems associated with long pipelines, variable length integer pipeline 600 attempts to operate as a four stage integer pipeline when possible. However, when a pipeline stall in decode stage 130 occurs, variable length integer pipeline 600 would expand to continue accepting instructions. For example, if a load-use data dependency problem occurs, which would cause an instruction to remain in decode stage 130, variable length integer pipeline 600 would expand to include expansion one stage 630 if pre-decode stage 110 issues another instruction. Specifically, pre-decode stage 110 would be able to issue the new instruction into expansion one stage 630. Similarly, variable length integer pipeline 600 can accept an additional instruction by expanding to include expansion two stage 610 so that the instruction in pre-decode stage 110 can be issued into expansion two stage 610. In embodiments of the present invention having additional expansion stages, a variable length integer pipeline can expand to include the additional expansion stages so that pre-decode stage 110 can issue additional instructions into variable length integer pipeline 600.

When variable length integer pipeline 600 is in an expanded mode, i.e. operating with expansion stages, variable length integer pipeline 600 can contract when an instruction is processed through decode stage 130 of variable length integer pipeline 600 and when no new instruction is issued to variable integer pipeline 600. Thus, in general, variable length integer pipeline 600 contracts when variable length integer pipeline is not stalled and no integer instruction is issued to variable length integer pipeline 600.

FIGS. 7(*a*)–7(*j*) illustrate the expansion and contraction of variable length integer pipeline 600 as variable length integer pipeline 600 and load/store pipeline 200 process the instructions in Table 1. In the description of the function of each instruction in Table 1, DX represents data register DX, the value of data register DX is abbreviated as VDX, and AX is memory location AX, where X is an integer.

TABLE 1

| Instruction | Function |
| --- | --- |
| SUB D3, D1, #1 | Subtract 1 from VD1 and store in D0 |
| LD D0, [A1] | Load the value at A1 into D0 |
| ADD D3, D0, #1 | Add 1 to VD0 and store in D3 |
| LD D0, [A2] | Load the value at A2 into D0 |
| ADD D3, D0, #2 | Add 2 to VD0 and store in D3 |
| LD D0, [A3] | Load the value at A3 into D0 |
| ADD D3, D0, #3 | Add 3 to VD0 and store in D3 |
| LD D0, [A4] | Load the value at A4 into D0 |
| ADD D3, D0, #4 | Add 4 to VD0 and store in D3 |

To better track load-use data dependency problems through the instructions of Table 1, the instructions in Table 1 are selected so that each load-add instruction pair that has a load-use data dependency problem loads from address AX and adds #X to the value in data register D0, where X is 1, 2, 3, or 4. Instruction "SUB D3, D1, #1" is used to illustrate the performance of variable length integer pipeline 600 in a non-expanded mode of operation.

As shown in FIG. 7(*a*), instruction "LD D0, [A1]" is first processed in decode stage 230 of integer pipeline 200 and instruction "SUB D3, D1, #1" is processed in decode stage 130 of variable length integer pipeline 600. Then, as shown in FIG. 7(*b*), instruction "LD D0, [A1]" is processed in execute one stage 240 of integer pipeline 200 and instruction "SUB D3, D1, #1" is processed in execute one stage 140. Concurrently, instruction "ADD D3, D0, #1" is being processed in decode stage 130 and instruction "LD D0, [A2]" is being processed in decode stage 230.

As explained above, instructions "ADD D3, D0, #1" and "LD D0, [A1]" have a load-use data dependency problem. Thus as illustrated in FIG. 7(*c*) instruction "ADD D3, D0, #1" remains in decode stage 130 while the other instructions proceed to the next stage of the pipelines. Specifically, instruction "SUB D3, D1, #1" is processed by execute two stage 150, instruction "LD D0, [A1] is processed by execute two stage 250, and instruction "LD D0, [A2]" is processed by execute one stage 240. Furthermore, instruction "LD D0, [A3]" is issued to decode stage 230. To avoid stalling, variable length integer pipeline 600 expands to include expansion one stage 630 so that pre-decode stage 110 can issue instruction "ADD D3, D0, #2" into expansion one stage 630.

In the example of FIG. 7, variable instruction pipeline does not include a forwarding pass from execute two stage 250 to decode stage 130. Thus, as illustrated in FIG. 7(*d*), instruction "ADD D3, D0, #1" remains in decode stage 130 and instruction "ADD D3, D0, #2" remains in expansion one stage 630. Instruction "SUB D3, D1, #1" is processed by write back stage 160, instruction "LD D0, [A1]" is processed by write back stage 260, instruction "LD D0, [A2]" is processed by execute two stage 250, and instruction "LD D0, [A3]" is processed by execute one stage 240. Furthermore, instruction "LD D0, [A4]" is issued to decode stage 230. To avoid stalling, variable length integer pipeline 600 expands again to include expansion two stage 610 to allow pre-decode stage 110 to issue instruction "ADD D3, D0, #3" into expansion two stage 610.

At the next clock cycle as illustrated in FIG. 7(*e*), instruction "ADD D3, D0, #1" can proceed to execute one stage 140 because write back stage 260 can forward the new value for data register D0 to execute one stage 140. Consequently, instruction "ADD D3, D0, #2" can proceed to decode stage 130 and instruction "ADD D3, D0 #3" can proceed to expansion one stage 630. Instruction "SUB D3, D1, #1" is complete and leaves variable length integer pipeline 600. Similarly, instruction "LD D0, [A1]" is complete and leaves load/store pipeline 200. Instruction "LD D0, [A2]" is processed by write back stage 260, instruction "LD D0, [A3]" is processed by execute two stage 250, and instruction "LD D0, [A4]" is processed by execute one stage 240. Furthermore, instruction "ADD D3, D0, #4" is passed to expansion two stage 610.

Figure 7A:
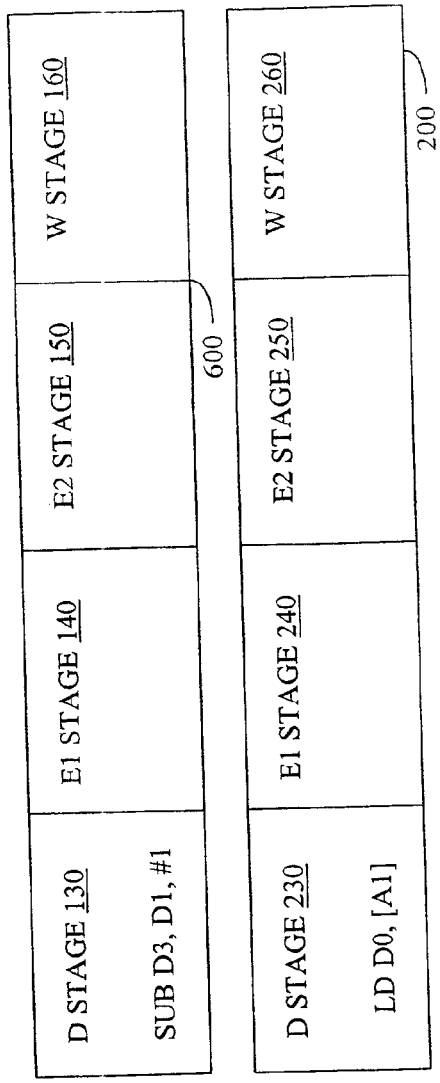
Figure 7B:
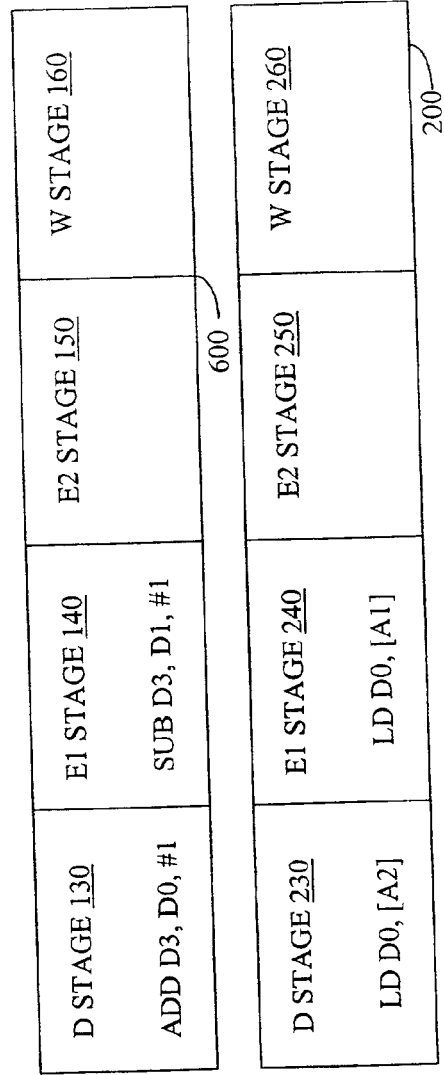

At the next clock cycle as illustrated in FIG. 7(f), no new instructions are issued by pre-decode stage 110 (FIG. 6) and decode stage 130 can receive an instruction. Consequently, variable length integer pipeline 600 can contract and remove expansion two stage 610. Instruction "ADD D3, D0, #1" is processed by execute two stage 150, instruction "ADD D3, D0, #2" is processed by execute one stage 140, instruction "ADD D3, D0, #3" is processed by decode stage 130 and instruction "ADD D3, D0 #4" can proceed to expansion one stage 630. Instruction "LD D0, [A2] is complete and leaves load/store pipeline 200. Instruction "LD D0, [A3]" is processed by write back stage 260, and instruction "LD D0, [A4]" is processed by execute two stage 250.

Figure 7G:
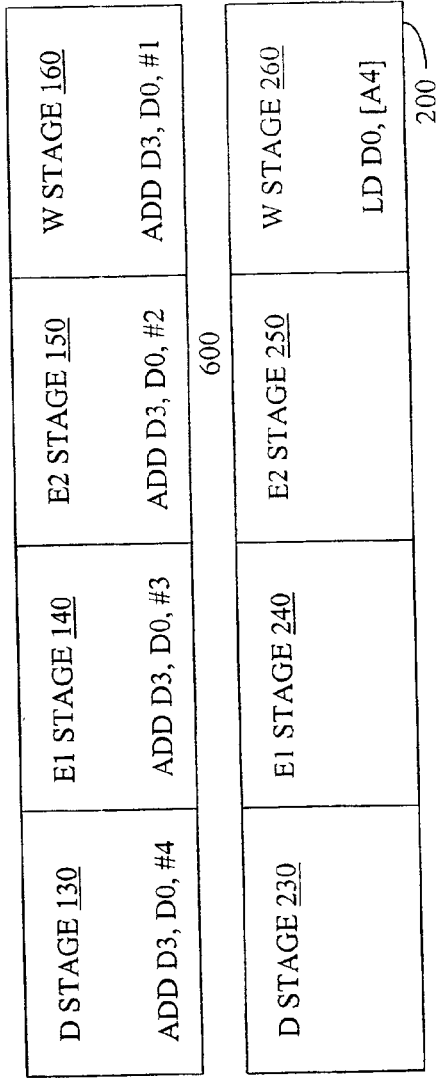

At the next clock cycle as illustrated in FIG. 7(g), no new instructions are issued by pre-decode stage 110 (FIG. 6) and variable length integer pipeline 600 is not stalled. Consequently, variable length integer pipeline 600 can contract again and remove expansion one stage 630. Instruction "ADD D3, D0, #1" is processed by write back stage 160, instruction "ADD D3, D0, #2" is processed by execute two stage 150, instruction "ADD D3, D0, #3" is processed by execute one stage 140, and instruction "ADD D3, D0, #4" is processed by decode stage 130. Instruction "LD D0, [A3]" is complete and leaves load/store pipeline 200. Instruction "LD D0, [A4]" is processed by write back stage 260.

Figure 7H:
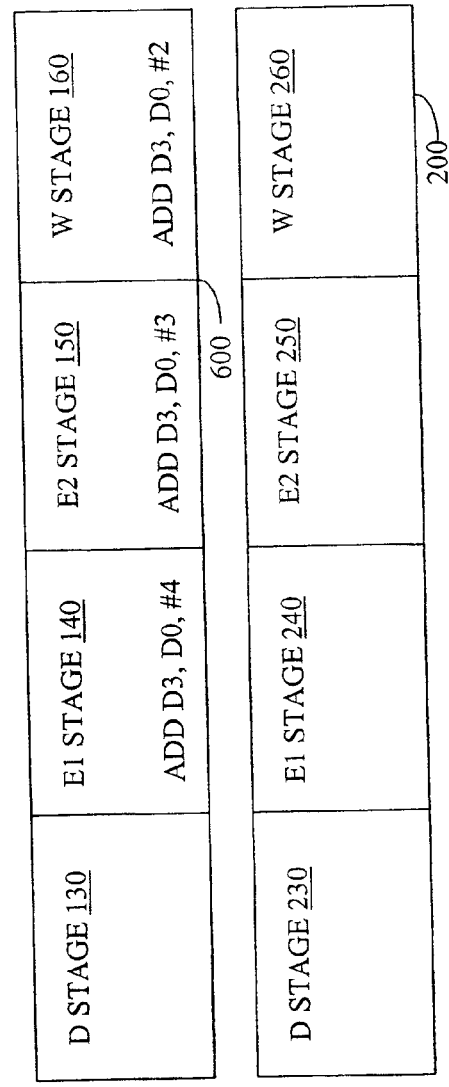

At the next clock cycle as illustrated in FIG. 7(h), Instruction "ADD D3, D0, #1" is complete and leaves variable length integer pipeline 600. Instruction "ADD D3, D0, #2" is processed by write back stage 160, instruction "ADD D3, D0, #3" is processed by execute two stage 150, and instruction "ADD D3, D0, #4" is processed by execute one stage 140. Instruction "LD D0, [A4]" is complete and leaves load/store pipeline 200.

Figure 7I:
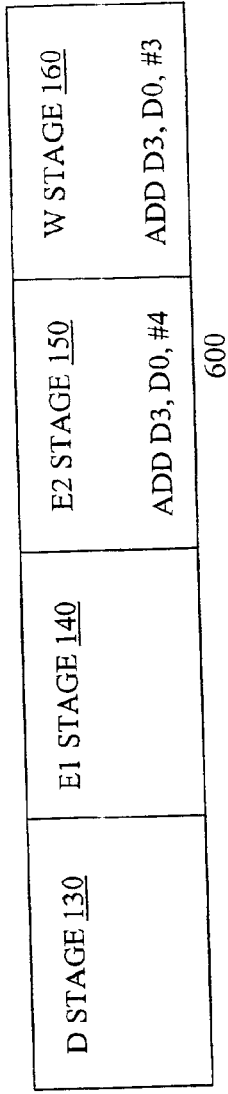
Figure 7I:
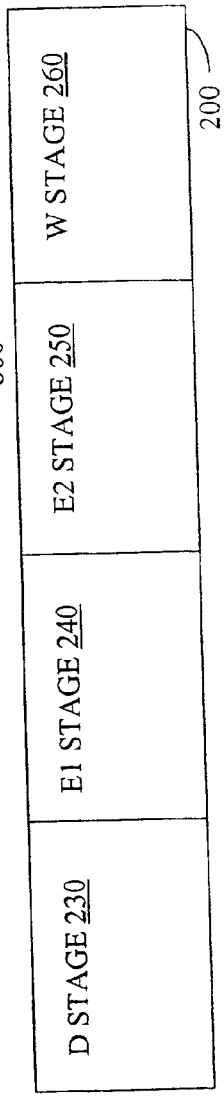
Figure 7J:
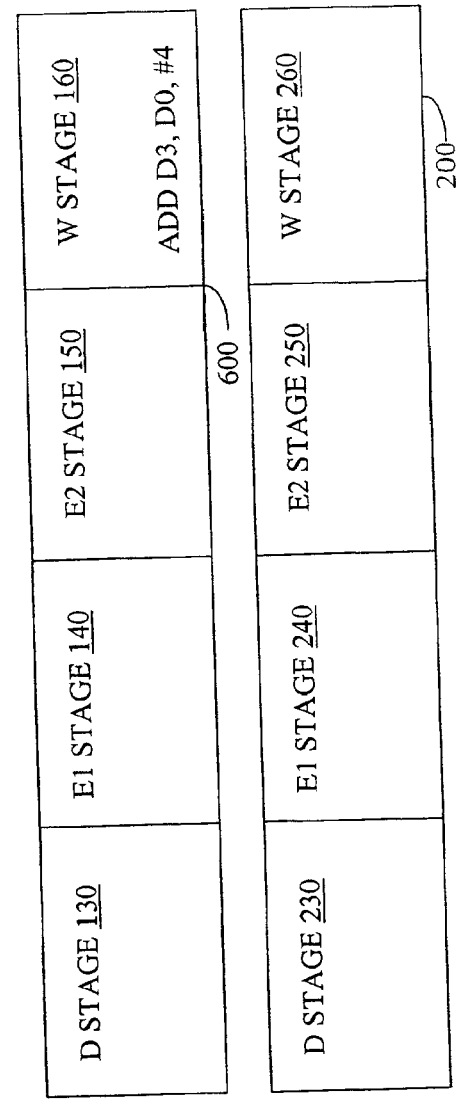

At the next clock cycle as illustrated in FIG. 7(i), Instruction "ADD D3, D0, #2" is complete and leaves variable length integer pipeline 600. Instruction "ADD D3, D0, #3" is processed by write back stage 160 and instruction "ADD D3, D0, #4" is processed by execute two stage 150. At the next clock cycle as illustrated in FIG. 7(j), instruction "ADD D3, D0, #3," is complete and leaves variable length integer pipeline 600. Instruction "ADD D3, D0, #4" is processed by write back stage 160.

In the various embodiments of this invention, novel structures and methods have been described to avoid pipeline stalls as well as to avoid problems associated with large pipelines. Using a variable length integer pipeline in accordance with an embodiment of the present invention, common pipeline stalls can be avoided by expanding the variable length integer pipeline by including one or more expansion stages. After the stalls are avoided, the variable length integer pipeline contracts when no instructions are issued to the integer pipeline and the integer pipeline is not stalled. Because, the variable length integer pipeline usually stays in the contracted state, problems associated with large pipelines are minimized. The various embodiments of the structures and methods of this invention that are described above are illustrative only of the principles of this invention and are not intended to limit the scope of the invention to the particular embodiments described. For example, in view of this disclosure, those skilled in the art can define other instruction fetch stages, pre-decode stages, decode stages, execute stages, expansion stages, write back stages, forwarding paths, instruction pipelines, load/store pipelines, integer pipelines, instructions, and so forth, and use these alternative features to create a method or system according to the principles of this invention. Thus, the invention is limited only by the following claims.

What is claimed is:

1. An variable length instruction pipeline comprising:
   a first pipeline stage;
   a first expansion stage coupled to the first pipeline stage;
   a second pipeline stage coupled to the first pipeline stage and the first expansion stage, wherein the second pipeline stage is configured to selectively receive instructions from the first pipeline stage or the first expansion stage; and
   a second expansion stage coupled to the first pipeline stage and the first expansion stage and wherein the first expansion stage is configured to selectively receive instructions from the first pipeline stage or the second expansion stage.

2. The variable length instruction pipeline of claim 1, further comprising a multiplexer coupled between the first expansion stage and the second pipeline stage and between the first pipeline stage and the second pipeline stage.

3. The variable length instruction pipeline of claim 1, further comprising a multiplexer coupled between the second expansion stage and the first expansion stage and between the first pipeline stage and the first expansion stage.

4. The variable length instruction pipeline of claim 1, further comprising a third pipeline stage coupled to the second pipeline stage.

5. The variable length instruction pipeline of claim 1, wherein the first pipeline stage is part of an instruction fetch and decode unit.

6. The variable length instruction pipeline of claim 5, wherein the instruction fetch and issue unit further comprises an instruction fetch stage coupled to the first pipeline stage.

7. The variable length instruction pipeline of claim 1, wherein the second pipeline stage is a decode stage.

8. The variable length instruction pipeline of claim 1 configured to process integer instructions.

* * * * *